Jan. 28, 1936. C. B. DE VLIEG ET AL 2,029,094
POWER TRANSMISSION MECHANISM
Filed Dec. 9, 1932
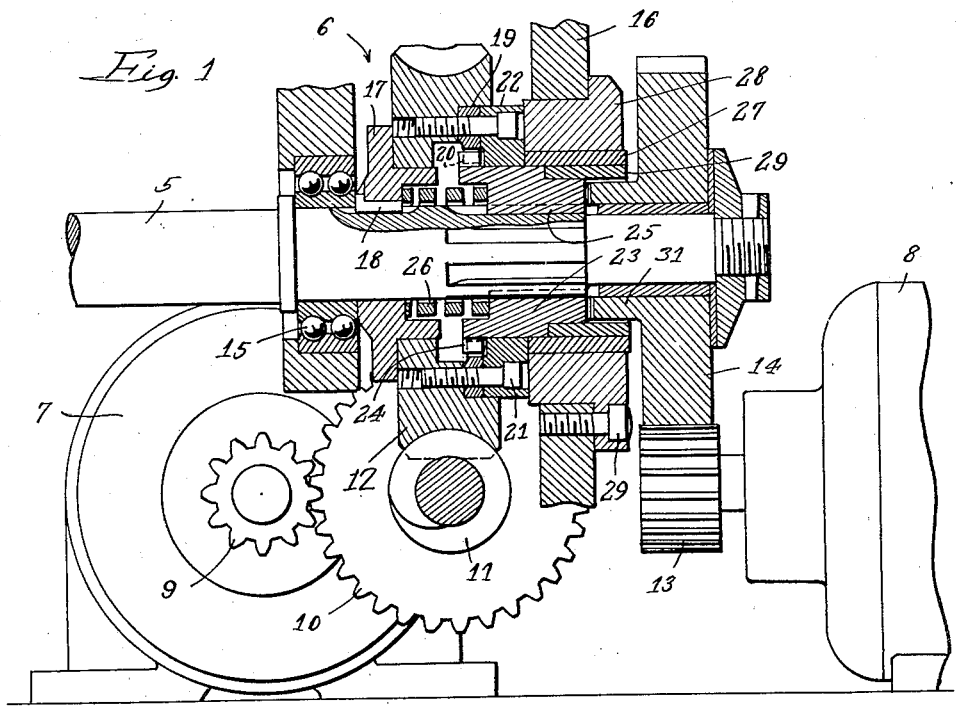
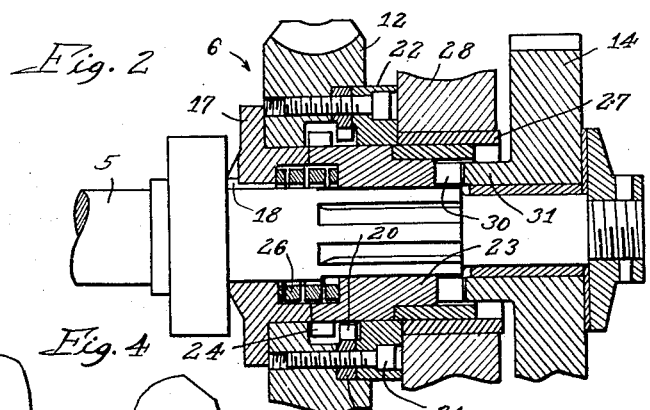
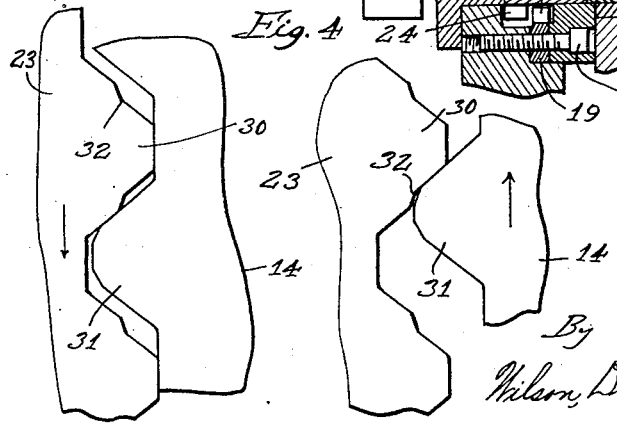
Inventors:
Charles B. De Vlieg
Nels S. Lundberg
By
Wilson, Dowell, McCanna & Wintercorn
Attys.

Patented Jan. 28, 1936

2,029,094

UNITED STATES PATENT OFFICE 2,029,094

POWER TRANSMISSION MECHANISM

Charles B. De Vlieg and Nels S. Lundberg, Jackson, Mich., assignors to Associated Patents, Inc., Cincinnati, Ohio, a corporation of Ohio Application December 9, 1932, Serial No. 646,424

39 Claims. (Cl. 74—389)

This invention relates generally to power transmission mechanisms.

The principal object of our invention is to provide a mechanism in which the driven part has power transmitted thereto selectively in either direction and at a relatively high or low speed, as desired, and in which all movements are controlled electrically or otherwise and automatically as distinguished from manually operable mechanical shifting devices. Thus, we obtain a mechanism adapted for remote control, meaning that the controls may be located at any point desired with ordinary wiring extended thereto and without mechanical connections to a shifting mechanism for obtaining the speed and direction of drive desired, and a wide range of automatic cycles involving any desired changes in speed and direction are made easily available without the use of mechanical load and fire devices.

Another important object of our invention is to provide a power transmission mechanism so constructed that changes in speed or direction of drive are accomplished instantaneously, merely by throwing into operation the proper electric motor. Thus, for example, the driven part may while it is being driven slowly by one motor, have the speed stepped up instantly by starting the other motor; there is no need for manually or otherwise declutching and letting the driven part slow down or come to a standstill and then reclutching to produce the speed change desired, as was otherwise the case.

Other objects and advantages of our invention too numerous to be outlined here will be brought out in the course of the following description, in which reference is made to the accompanying drawing, wherein—

Figure 1 is a longitudinal section through the power transmission mechanism of our invention showing the parts in position for low speed drive in either direction;

Fig. 2 is a similar section of a portion of the mechanism with the shiftable part shifted for high speed drive in either direction;

Fig. 3 is a developed view of the intermeshed cam shaped clutch teeth of the mechanism with the parts in the position disclosed in Figure 1, and Fig. 4 is a similar view of the same teeth with the parts in the position shown in Fig. 2.

The same reference numerals are applied to corresponding parts in the four views.

The shaft 5 in the mechanism herein illustrated is the driven part to which relatively high or low speed drive in either direction is to be transmitted. It is immaterial so far as the present invention is concerned what is connected with the shaft 5 to be driven thereby, since the present invention is primarily concerned with the power transmission mechanism indicated generally by the numeral 6. Low speed drive in either direction is obtainable when the reversible electric motor 7 is operated, and the reversible electric motor 8 is used to furnish the power for high speed drive in either direction. The terms "high" and "low" are used here in a purely relative sense, it being immaterial what particular speeds are obtained. Consistent with the fact that the motor 7 furnishes power for low speed drive, we have shown reduction gears 9 and 10 and the meshing of a worm 11 with worm gear 12 for a two-stage reduction. It will, however, be understood that a lower speed motor might be used and directly connected with the worm 11 or gear 12. Consistent with the high speed drive obtained from motor 8, we have shown the gear 13 in direct mesh with gear 14 so that there is little reduction in speed. The invention is not limited to any specific gearing for transmitting low speed drive in either direction from motor 7 to gear 12 and high speed drive in either direction from motor 8 to gear 14.

The shaft 5 is shown as suitably supported in an anti-friction bearing 15 in a housing, a portion of one wall of which is indicated at 16. The worm gear 12 is in the housing and is adapted to turn on a hub 17 suitably fixed on the shaft 5 as by means of a key 18. A ring clutch element 19 having internal teeth 20 is fastened to the opposite side of the worm gear 12 by cap screws 21, together with a cover plate 22. The latter has a working fit on a sleeve 23 which projects into the chamber formed in the center of the worm gear and has spur teeth 24 projecting from the periphery thereof at the inner end and made to mesh with the internal teeth 20 of the ring 19. The sleeve is splined on the shaft 5, as indicated at 25, so as to transmit drive thereto in either of its two operative positions shown in Figs. 1 and 2. A coiled compression spring 26 surrounding the shaft 5 between the hub 17 and sleeve 23 tends normally to move the sleeve to the right so as to engage the teeth 24 with the teeth 20. The sleeve 23 has a sliding rotating fit in a bushing 27 in a hub 28 fastened as at 29 to the housing wall 16. Another bushing 29 pressed on the reduced outer end of the sleeve 23 holds the sleeve 23 in proper relation to the bushing 27 when the sleeve 23 moves from the position of Figure 1 to that of Fig. 2. Cam-shaped clutch teeth 30 formed on the end of the sleeve 23 mesh with companion teeth 31 formed on the adjacent face of the hub of the gear 14. The angle of the abutting faces of the teeth 30 and 31 is not sufficient for slippage to occur when the sleeve 23 is the driver, as illustrated in Fig. 3, but is sufficient for slippage to occur when the gear 14 is the driver. The point is that the spring 26 exerts sufficient pressure to keep the sleeve 23 to the extreme right with the teeth 24 thereof meshed with teeth 20, so long as there is not a sufficient component of force applied in the opposite direction to overcome the action of the spring. Thus, the sleeve 23 in driving the gear 14 only has to overcome the slight resistance of "winding" the armature of the motor 8 at a slow speed, which occurs when the slow speed drive is applied to shaft 5 by motor 7. An arrow is shown in Fig. 3 to indicate the direction in which the sleeve 23 is turnng the gear 14; the sleeve 23 may, however, be turned in either direction and the same facts would apply. However, when the gear 14 is the driver, there is immediately a reactionary force by reason of the fact that the worm 11 and worm gear 12 act as an anchor, the gear 12 being held against turning by reason of the meshing of the worm 11 therewith, that is, when the motor 7 is not running; if the motor 7 is running the worm gear 12 is nevertheless turning so much more slowly than the gear 14 that there would still be the reactionary force sufficient to result in the cam teeth 30 slipping on the teeth 31 and moving the sleeve 23 to the left against the action of the spring 26. In that way the teeth 24 are disengaged from the teeth 20, as appears in Fig. 2. The arrow applied to gear 14 in Fig. 4 indicates the direction of drive in that instance, but it should be understood that the gear 14 may be driven in either direction and the same facts would apply, that is, so far as shifting of the sleeve 23 against the action of spring 26 is concerned. The teeth 30 have offsets 32 made in the faces near the outer ends. This is for the purpose of releasably locking the parts in "high" so that the spring 26 will be incapable of shifting the sleeve 23 back to "low" until the motor 8 is stopped, assuming that both motors are running at one time, or until the motor 7 is started after the motor 8 has been stopped. When the teeth 30 and 31 are in the relationship disclosed in Fig. 4, the inner end of the sleeve 23 is in solid metal to metal abutment with the hub 17, as disclosed in Fig. 2, so that positive drive from gear 14 to shaft 5 is secured.

In operation, assuming that both motors are idle, slow speed drive is obtained in either direction by accordingly operating the motor 7. When the motor 7 is thrown into operation, the worm gear 12 is turned slowly and transmits drive to the shaft 5 through the sleeve 23. The teeth 24 are kept in mesh with the teeth 20 by reason of the fact that there is not sufficient reactionary force in the driving of the gear 14 slowly from the sleeve 23 to overcome the action of the spring 26. In other words, the armature of the motor 8 is simply turned over slowly, this drag on the driving of the shaft 5 being so slight as to be unobjectionable. Now, even while the motor 7 is operating, one may throw the motor 8 into operation to secure high speed drive in either direction, accordingly as the circuit for the motor 8 is closed. The moment the motor 8 starts it picks up the drive by causing the disengagement of the teeth 24 of sleeve 23 with the teeth 20 in the manner above described, thus driving the shaft 5 directly from the sleeve 23, while the worm gear 12 turns idly at a slower speed. There is, therefore, capacity for overrunning in either direction of the motor 8 relative to motor 7, or what amounts to the same thing, overrunning in either direction of the drive member 14 relative to the drive member 12. The novel construction of the clutch 20—24, 30—31, is responsible for this capacity for overrunning in either direction. The movement of the sleeve 23 in the disengagement of the teeth 24 from the teeth 20, as mentioned before, is positively limited by engagement with the hub 17 as shown in Fig. 2, so that there can be no further slippage of the teeth 30 relative to the teeth 31 and the drive will be positive, the teeth being then in the position disclosed in Fig. 4. It is manifest that the switches for controlling the electric motors 7 and 8 may be at some remote point and simply connected by wiring with the motors. This greatly simplifies matters in various installations of our power transmission mechanism. Where mechanical controls had to be relied upon, it involved extension of shafts and linkages from the operator's station to the mechanism under control, thus seriously complicating matters of design. The fact that the drive is picked up instantaneously as above described simply by starting the proper motor, means simpler operation and the elmination of all load and fire devices and, of course, greatly simplifies matters of design, and makes innumerable automatic cycles available involving intermittent drives at high and low speeds and reverses in direction of drive, as desired. Drives of this kind are used in machine tools generally for moving the work carrier or the tool carrier, or both. While our invention is particularly advantageous in its application to machine tools, especially where automatic cycles are desired, it is not limited to this use but may be applied wherever power transmission mechanisms having the functions of our invention may be utilized.

We claim:

1. In a power transmission mechanism, the combination of a driven shaft, a worm gear rotatably mounted thereon, a second gear rotatably mounted on said shaft, a worm meshed with the worm gear to transmit drive thereto or hold the same against turning, a relatively slow speed power means for driving said worm, a relatively high speed power means for driving the second gear, a sleeve slidably but nonrotatably mounted on said shaft to transmit drive thereto from either of said gears, intermeshable drive teeth on said worm gear and sleeve engaged when the sleeve is in one limit position and disengaged when the sleeve is in another limit position, constantly meshed cam-shaped drive teeth on said sleeve and second gear adapted to cause movement of the sleeve from the first limit position to the other limit position when drive is transmitted to the sleeve from the second gear, whereby to disengage the first mentioned drive teeth, and spring means tending normally to return said sleeve to the first limit position.

2. A mechanism as set forth in claim 1, wherein the second power means is adapted to drive said second gear in either direction, the cam-shaped drive teeth being formed so as to move the sleeve in the same manner with either direction of drive.

3. A mechanism as set forth in claim 1, wherein the first power means is adapted to drive said worm gear in either direction, and wherein the second power means is adapted to drive said second gear in either direction, the cam-shaped drive teeth being formed so as to move the sleeve in the same manner with either direction of drive.

4. A mechanism as set forth in claim 1, wherein the second power means comprises a reversible electric motor, the cam-shaped drive teeth being formed so as to move the sleeve in the same manner with either direction of drive.

5. A mechanism as set forth in claim 1 wherein the first power means comprises a reversible electric motor, and wherein the second power means comprises a reversible electric motor, the cam-shaped drive teeth being formed so as to move the sleeve in the same manner with either direction of drive.

6. A mechanism as set forth in claim 1, wherein the two power means are independent and operative separately to transmit high or low speed drive selectively to the driven shaft, and wherein the second power means is arranged to be thrown into operation while the first power means is in operation, whereby to effect a substantially instantaneous step up in speed of said driven shaft.

7. A mechanism as set forth in claim 1, wherein the two power means are independent and operative separately to transmit high or low speed drive selectively to the driven shaft, and wherein the second power means is arranged to be thrown into operation while the first power means is in operation, whereby to effect a substantially instantaneous step up in speed of said driven shaft, the two means being furthermore reversible whereby to secure substantially instantaneous reversals in the direction of drive of said shaft.

8. A mechanism as set forth in claim 1, wherein the two power means comprise reversible electric motors independently operable to secure slow or high speed drive of the shaft, said motors being selectively operable in either direction according to the direction of drive desired, the motor for high speed drive being furthermore arranged to be thrown into operation while the other motor is operating, whereby to effect a substantially instantaneous step up in speed of said driven shaft.

9. In a power transmission mechanism, the combination of a driven shaft, two drive members rotatably mounted thereon, the first for relatively low speed drive and the second for relatively high speed drive, a sleeve slidably but nonrotatably mounted on said shaft to transmit drive thereto from either of said members, intermeshable drive teeth on the first member and sleeve engaged when the sleeve is in one limit position and disengaged when the sleeve is in another limit position, constantly meshed cam-shaped drive teeth on said sleeve and second member adapted to cause movement of the sleeve from the first limit position to the other limit position when drive is transmitted to the sleeve from the second member, whereby to disengage the first mentioned drive teeth, and spring means tending normally to return said sleeve to the first limit position.

10. A mechanism as set forth in claim 9, wherein the second member is adapted to turn in either direction to drive the shaft in either direction, the cam-shaped drive teeth being formed so as to move the sleeve in the same manner with either direction of drive.

11. A mechanism as set forth in claim 9 wherein the first member is adapted to turn in either direction to drive the shaft in either direction, and wherein the second member is adapted to turn in either direction to drive the shaft in either direction, the cam-shaped drive teeth being formed so as to move the sleeve in the same manner with either direction of drive.

12. A mechanism as set forth in claim 9, wherein the two drive members are independent and arranged to be operated separately to transmit high or low speed drive selectively to the driven shaft, and wherein the second drive member is arranged to be thrown into operation while the first drive member is in operation, whereby to effect a substantially instantaneous step up in speed of the driven shaft.

13. In a power transmission mechanism, the combination of a driven shaft, two electric motors independently operable for transmitting relatively high and low speed drives to said shaft, a shiftable drive sleeve on said shaft, a pair of gears rotatably mounted on said shaft on opposite sides of said sleeve, each having means for clutching the sleeve so as to transmit drive therethrough to the shaft, one gear having driving connection with one motor and the other gear having driving connection with the other motor, and means for automatically shifting said sleeve between said gears so as to declutch one of said gears when the other gear has drive transmitted thereto.

14. A mechanism as set forth in claim 13, wherein the motor driving the last mentioned gear is reversible to accordingly afford drive for the shaft in either direction, and wherein the last mentioned means is constructed so as to automatically shift the sleeve so as to declutch the other gear when either direction of drive is selected.

15. In a power transmission mechanism, the combination of a driven shaft, two reversible electric motors independently operable for transmitting relatively high and low speed drive to said shaft, a drive sleeve on said shaft, gears mounted on said shaft at opposite ends of the sleeve, one gear having driving connection with one motor for drive thereof in either direction and the other gear having driving connection with the other motor for drive thereof in either direction, means for detachably clutching the one gear to turn with the sleeve, the other gear turning constantly with said sleeve, and means effective with the drive occurring in either direction for automatically declutching the first mentioned gear from the sleeve when the second mentioned gear has drive transmitted thereto.

16. In a power transmission mechanism, the combination of a driven shaft, a drive sleeve on said shaft, gears mounted on said shaft at opposite ends of the sleeve, a motor having driving connection with one gear, another motor having driving connection with the other gear to drive the same in either direction, means for detachably clutching the first gear to turn with the sleeve, the other gear turning constantly with the sleeve, and means for automatically declutching the first mentioned gear from the sleeve when the second mentioned gear has drive transmitted thereto in either direction.

17. In combination in a power transmission, a driven shaft, a pair of reversible motors independently or simultaneously operable for transmitting different drives to said shaft selectively in either direction, and automatic power transmission mechanism between the shaft and the motors to afford driving connections for each of said motors with said shaft, said mechanism including means operative to automatically disconnect one of said motors from driving relation to the shaft when the other motor is thrown into operation, irrespective of the selected direction of drive of the latter motor, but to mainain operative connections between both of said motors and the shaft when only said one of said motors is energized.

18. In combination in a power transmission, a driven shaft, a motor for relatively slow speed driving of the shaft, another motor for relatively high speed driving of the shaft in either direction, driving connections between the second motor and the shaft, other driving connections between the first motor and the shaft, the last mentioned driving connections being detachable, said motors being independently or simultaneously operable and means constructed so as to automatically disconnect the first motor from driving relation to the shaft when the second motor is operated in either direction but to maintain operative connections between both of said motors and the driven shaft when only the first motor is energized.

19. In combination in a power transmission, a driven shaft, a motor for relatively slow speed driving of the shaft, another motor for relatively high speed driving of the shaft in either direction, driving connections between the second motor and the shaft, other driving connections between the first motor and the shaft, the last mentioned driving connections being detachable, said motors being independently or simultaneously operable and means constructed so as to automatically disconnect the first motor from driving relation to the shaft when the second motor is operated in either direction but to maintain operative connections between both of said motors and the driven shaft when only the first motor is energized, said means being further constructed so as to automatically reconnect the first motor in driving relation to the shaft when the second motor is stopped.

20. In combination in a power transmission, a driven shaft, a pair of reversible driving means independently or simultaneously operable for transmitting different drives to said shaft selectively in either direction, transmission means to provide a driving connection between one of the driving means and said shaft, another transmission means to provide a driving connection between the other driving means and the shaft, and means rendered effective when one of the driving means is thrown into operation for selectively connecting said driving means with said shaft through the transmission, means associated with said driving means, irrespective of the direction of drive selected, said means including means maintaining operative connections between both driving means and the driven shaft when only one of said driving means is operated.

21. In combination, a driven member, a plurality of reversible drive members having drive connections with said driven member and with each other, including an anchor member in one of said drive connections reacted upon by another of said drive connections with said other drive occurring in either direction, and also including automatic disconnecting means separating said first mentioned drive connections upon such reaction.

22. In combination in a power transmission, a driven member, a plurality of reversible drive members independently or simultaneously operable having drive connections with said driven member and with each other including automatic disconnecting means between said drive connections arranged to maintain operative connections between both of the drive members and the driven member when only one of said drive members is operated, and spring means normally urging said disconnecting means to establish driving connection between one of said drive members and said driven member.

23. In combination, a driven member, a plurality of reversible drive members, clutching means and cam means having coincident axes, said clutching means being operatively disposed between one of said drive members and said driven member, and said cam means operable in reverse rotative directions for disengaging said clutching means upon operation of the other of said drive members.

24. In combination, a driven member, a plurality of reversible drive members, clutching means and cam means having coincident axes, anchor means for one of said drive members having reaction thereon by the other of said drive members, said clutching means being operatively disposed between one of said drive members and said driven member, and said cam means acting to disengage said clutching means upon operation of the other of said drive members in either direction.

25. In combination in a power transmission, a driven member, a drive member, a drive connection between said drive member and said driven member including disconnecting means, and a second and reversible drive member operable independently or simultaneously with the first drive member and having drive connection with said driven member and acting to operate said disconnecting means when operated in either direction, said disconnecting means including means for maintaining operative connections between both drive members and the driven member when only the first of said drive members is operated.

26. In a power transmission, two drive means adapted to be set into operation selectively in either direction, one for relatively low and the other for relatively high speed, a driven member, drive connections for said means with said member and with each other, including an intermeshed worm and gear anchor in the slow speed drive connections for speed reduction purposes and reacted upon by the high speed drive connections, and declutching means dependent upon such reaction for automatically disconnecting the slow speed drive means when the high speed drive means is operated in either direction.

27. In a power transmission mechanism, the combination of a driven shaft, a shiftable drive sleeve on said shaft, a pair of gears rotatably mounted on said shaft on opposite sides of said sleeve, each having means for clutching the sleeve so as to transmit drive therethrough to the shaft, power means for transmitting relatively high speed drive to the one gear and relatively low speed drive to the other gear, and means for automatically shifting said sleeve between said gears so as to declutch one of said gears when the other gear has drive transmitted thereto.

28. A mechanism as set forth in claim 27 wherein the gears are driven reversibly and wherein the last mentioned means is constructed so as to automatically shift the sleeve to declutch one of said gears when the other gear has drive transmitted thereto in either direction.

29. In a power transmission, the combination of a driven shaft, a first driving member, a second driving member, said driving members being operable independently or simultaneously and either of said members being adapted to transmit drive to the shaft and the second member being adapted to overrun the first member in either direction and correspondingly drive the shaft, and an overrunning clutch mechanism providing driving connections between the members and the shaft, said mechanism including means for maintaining operative connections between both of said driving members and the driven shaft when only the first of said driving members is operated.

30. In a power transmission, the combination of two reversible drive members that are operable independently or simultaneously, a driven member, and an overrunning clutch between said drive members and said driven member constructed so as to give one drive member capacity for overrunning with respect to the other in either direction, said clutch including means to maintain operative connections between both of said drive members and the driven member when only said other drive member is operated.

31. In combination in a power transmission, two rotary coaxial drive members that are operable independently or simultaneously, a driven member, and an overrunning clutch therebetween constructed so as to give one drive member, which is operable in either direction capacity for overrunning with respect to the other in either direction, said clutch including means to maintain operative connections between both of said drive members and the driven member when only said other drive member is operated.

32. In a power transmitting mechanism, a driven member, two reversible drive members in coaxially spaced relation on the driven member, one drive member being mounted on the driven member so as to turn therewith continuously, the other drive member being rotatable on the driven member, and an overrunning clutch providing a detachable driving connection between the last mentioned drive member and the driven member, said clutch also providing a connection between the two drive members causing the first mentioned drive member to overrun the second mentioned drive member in either direction.

33. In a power transmitting mechanism, a driven member, two drive members in coaxially spaced relation on the driven member, one drive member being mounted on the driven member so as to turn therewith continuously, the other drive member being rotatable on the driven member, and an overrunning clutch providing a connection between the two drive members so as to permit the first mentioned drive member to overrun the second mentioned drive member in either direction, said clutch comprising a shiftable element arranged in one position to provide a detachable driving connection for the second mentioned drive member and the driven member, and means automatically causing the shiftable element to be shifted from the latter position when the first mentioned drive member overruns.

34. In a power transmitting mechanism, a driven member, two drive members in coaxially spaced relation on the driven member, one drive member being mounted on the driven member so as to turn therewith continuously, the other drive member being rotatable on the driven member, an overrunning clutch providing a connection between the two drive members so as to permit the first mentioned drive member to overrun the second mentioned drive member in either direction, said clutch comprising a shiftable element arranged in one position to provide a detachable driving connection for the second mentioned drive member and the driven member, said clutch automatically causing the shiftable element to be shifted from the latter position when the first mentioned drive member overruns, and spring means normally urging the shiftable element in the opposite direction.

35. In combination in a power transmission, a driven shaft, power means for relatively slow and high speed drive in either direction, driving connections between the shaft and the high speed portion of the power means, other driving connections between the shaft and the low speed portion of the power means, the last mentioned driving connections being detachable, and means for automatically disconnecting the shaft from driving relation to the low speed power means when the high speed power means is operated in either direction but maintaining operative connections between the low and high speed power means and the driven shaft when only the low speed power means is energized.

36. In a power transmission, the combination with a rotary shaft, the speed and direction of which is to be remotely controlled, two motors for selectively driving the shaft, said motors being remotely controllable and one being adapted to drive the shaft at a relatively slow speed in either direction and the other being adapted to drive the shaft at a relatively high speed in either direction, as selected, and driving connections between the motors and the shaft including an overrunning clutch constructed so as to permit overrunning of the high speed motor in either direction relative to the low speed motor, said clutch including means to maintain operative connections between both motors and the rotary shaft when only the low speed motor is energized.

37. In a power transmission mechanism, the combination of a driven shaft, two reversible electric motors independently or simultaneously operable to transmit relatively high and low speed drives to said shaft, a drive sleeve on said shaft, gears mounted on said shaft at opposite ends of said sleeve, one gear having driving connection with one motor for drive in either direction and the other gear having driving connection with the other motor for drive in either direction, clutch teeth for detachably clutching the one gear with the sleeve, cam teeth causing the other gear to turn continuously with said sleeve, said cam teeth being effective to declutch the first gear from the sleeve when the second gear has drive transmitted thereto, and spring means normally tending to cause engagement of the clutch teeth.

38. In combination, in a power transmission, a driven shaft, two independently operable driving members coaxially arranged with respect to said shaft, a drive sleeve on said shaft, clutch teeth for detachably clutching one member with the sleeve, cam teeth causing the other member to turn continuously with said sleeve, said cam teeth being effective to automatically declutch the first member from the sleeve when the second member has drive transmitted thereto, and spring means normally tending to cause clutching of the first member.

39. In combination, in a power transmission, a driven shaft, two independently operable driving members coaxially arranged with respect to said shaft and arranged to have drive transmitted thereto in either direction, a drive sleeve on said shaft, clutch teeth for detachably clutching one member with the sleeve, cam teeth causing the other member to turn continuously with said sleeve, said cam teeth being effective with the drive occurring in either direction to automatically declutch the first member from the sleeve when the second member has drive transmitted thereto, and spring means normally tending to cause clutching of the first member.

CHARLES B. DE VLIEG.
NELS S. LUNDBERG.